United States Patent
Virdis et al.

(10) Patent No.: US 10,486,560 B2
(45) Date of Patent: Nov. 26, 2019

(54) SEATING SYSTEM FOR A MOTOR VEHICLE

(71) Applicant: C.R.F. SOCIETA'CONSORTILE PER AZIONI, Orbassano (IT)

(72) Inventors: Tiziana Virdis, Orbassano (IT); Stefano Bernard, Orbassano (IT); Alberto Contorbia, Turin (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 154 days.

(21) Appl. No.: 15/850,571

(22) Filed: Dec. 21, 2017

(65) Prior Publication Data
US 2018/0178684 A1 Jun. 28, 2018

(30) Foreign Application Priority Data
Dec. 22, 2016 (EP) .................................. 16206524.7

(51) Int. Cl.
*B60N 2/30* (2006.01)
*B60N 2/28* (2006.01)

(52) U.S. Cl.
CPC ........... *B60N 2/3086* (2013.01); *B60N 2/289* (2013.01); *B60N 2/2866* (2013.01); *B60N 2/2887* (2013.01); *B60N 2/2893* (2013.01); *B60N 2/309* (2013.01)

(58) Field of Classification Search
CPC .. B60N 2/3086; B60N 2/2866; B60N 2/2887; B60N 2/2893; B60N 2/309
See application file for complete search history.

(56) References Cited

U.S. PATENT DOCUMENTS

| 5,265,934 | A  | * | 11/1993 | Forget ................... | B60N 2/309 297/237 |
| 5,660,437 | A  | * | 8/1997  | Bauer .................. | B60N 2/3065 248/157 |
| 6,254,183 | B1 | * | 7/2001  | Bian ..................... | B60N 2/286 297/219.12 |
| 6,386,629 | B1 | * | 5/2002  | Severinski ........... | B60N 2/3011 297/188.1 |
| 7,070,239 | B1 | * | 7/2006  | Ugrekhelidze ...... | B60N 2/3084 297/105 |

(Continued)

FOREIGN PATENT DOCUMENTS

| DE | 4315479  | 5/1994 |
| DE | 19842825 | 3/2000 |

(Continued)

OTHER PUBLICATIONS

European Patent Office Search Report dated May 22, 2017, for European Patent Application No. 16206524.7, Applicant: C.R.F. Societa' Consortile Per Azioni (5 pages).

*Primary Examiner* — Gary C Hoge
(74) *Attorney, Agent, or Firm* — McCracken & Gillen LLC

(57) ABSTRACT

A seating system for a motor vehicle provides for a seat and a child safety seat defined by a body, which forms part of a seat cushion of the seat. The system has a releasable fastening apparatus of the ISOFIX type comprising two lower anchoring elements and two upper anchoring elements which can be selectively engaged by connecting elements carried by the body for securing the latter to the seat in a lowered position and a raised position, respectively.

17 Claims, 8 Drawing Sheets

(56) References Cited

U.S. PATENT DOCUMENTS

| | | | | |
|---|---|---|---|---|
| 7,517,016 | B1* | 4/2009 | West | B60N 2/832 |
| | | | | 297/236 |
| 2002/0089222 | A1* | 7/2002 | Pehrson | B60N 2/3013 |
| | | | | 297/344.12 |
| 2008/0088164 | A1* | 4/2008 | Ahlqvist | B60N 2/3086 |
| | | | | 297/311 |
| 2009/0079242 | A1* | 3/2009 | Erlingstam | B60N 2/3084 |
| | | | | 297/237 |
| 2012/0169099 | A1* | 7/2012 | Horiguchi | B60N 2/0232 |
| | | | | 297/314 |
| 2019/0160979 | A1* | 5/2019 | Maresky | B60N 2/3086 |
| 2019/0184861 | A1* | 6/2019 | Virdis | B60N 2/265 |

FOREIGN PATENT DOCUMENTS

| | | |
|---|---|---|
| DE | 10003559 | 8/2001 |
| DE | 20102329 | 6/2002 |
| EP | 1721777 | 11/2006 |

* cited by examiner

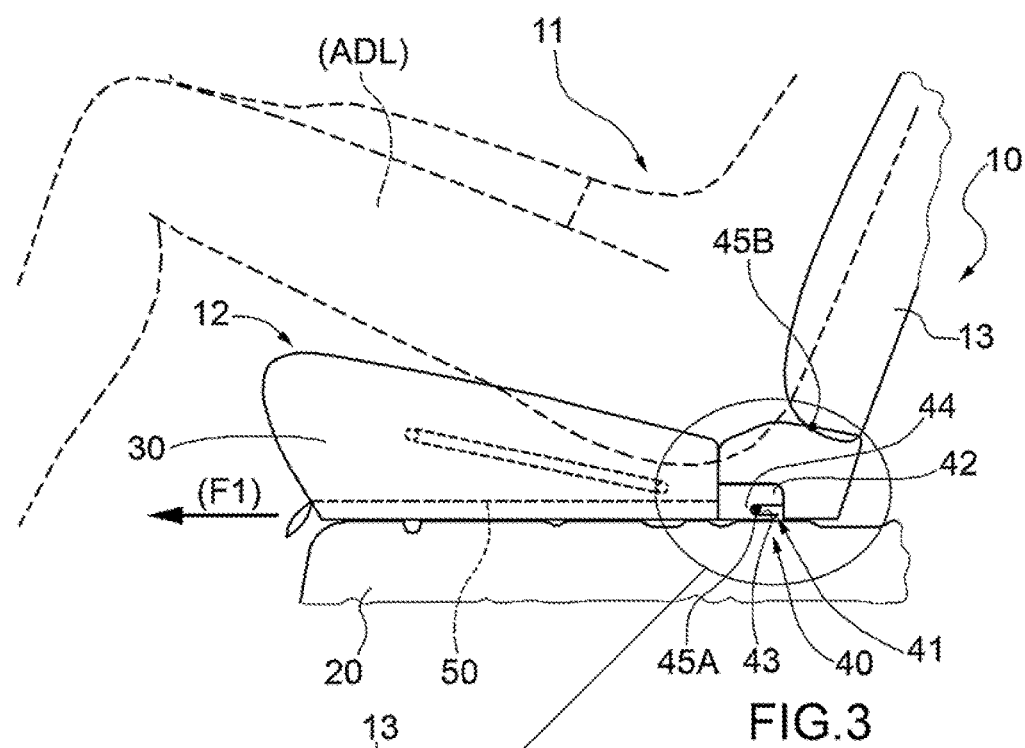
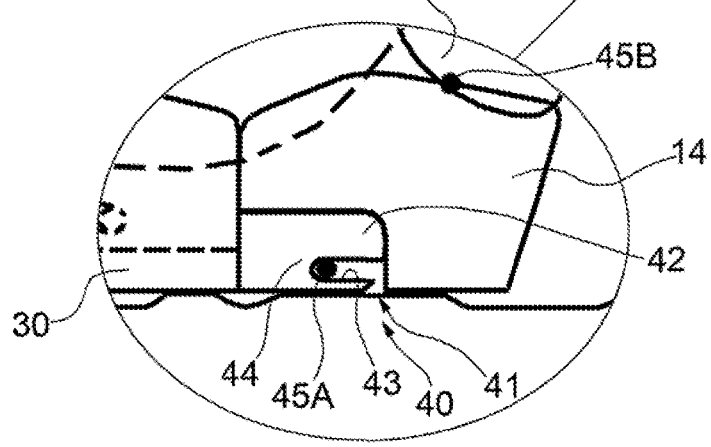
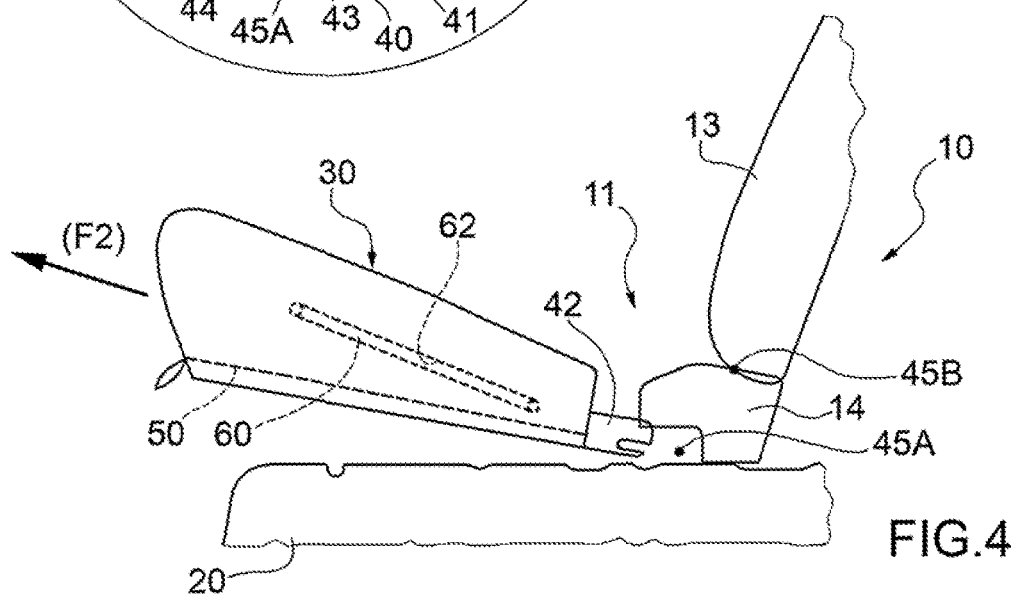

SEATING SYSTEM FOR A MOTOR VEHICLE

PRIORITY CLAIM

This application claims benefit of European Patent Application No. 16206524.7 filed on Dec. 22, 2016, the entire disclosure of which is incorporated by reference.

TECHNICAL FIELD

The present invention relates to a seating system for a motor vehicle.

BACKGROUND OF THE INVENTION

Incidentally, in the present text the various mechanical parts will be designated, as needed, also by using terms such as "front", "frontal", "rear", "lateral", "vertical", "bottom", "top", "upper", "lower", etc. with reference to their normal position of use in the motor vehicle.

In particular, the terms "lower" and "upper" are referred to a reference plane which substantially coincides with a horizontal floor of the motor vehicle floor on which at least one seat is rested and secured.

Child safety seats are known which can be mounted on normal motor vehicle seats.

Some child safety seats, in order to be coupled to normal motor vehicle seats, comprise coupling means having a horizontal slot designed to engage with a U-shaped (standard) anchoring element, commonly referred to as "anchoring element of the ISOFIX type", carried by the motor vehicle seats or fixed to the floor of the motor vehicle.

Together, the coupling means and the standard U-shaped anchoring element form a releasable fastening device of the ISOFIX type.

In use, for example when the anchoring element is engaged into the slot of the coupling means, a closing element automatically rotates towards its closed position, where it is locked by said anchoring element, which prevents its accidental release.

On the contrary, by manually pulling a cable or a control lever, the coupling means are unlocked and the closing element can thus rotate into the open position under the thrust of an additional spring, to release the child safety seat.

One of the most significant drawbacks of traditional seating systems is that the child safety seat (for example of the type commonly referred to as "after market"), when not in use, must be housed, for example, in the trunk of the motor vehicle, thus subtracting space valuable to the user, which, instead, could be advantageously used to accommodate suitcases and/or other objects.

SUMMARY OF THE INVENTION

Therefore, the main object of the present invention is to provide a seating system for a motor vehicle, which is free from the drawbacks described above and, at the same time, is easy and inexpensive to manufacture.

Therefore, according to the present invention, a seating system for a motor vehicle is provided, as claimed in claim 1 or in any one of the claims directly or indirectly dependent on claim 1.

BRIEF DESCRIPTION OF THE DRAWINGS

For a better understanding of the present invention, two preferred embodiments thereof will now be described, purely by way of non-limiting examples, with reference to the accompanying drawings, wherein:

FIG. 3 shows a cross section of the seating system illustrated in FIGS. 1, 2; moreover, the dashed lines represent an adult seated in the seating system;

FIG. 4 shows the actions of detaching and removing a child safety seat from a lower releasable fastening device;

DETAILED DESCRIPTION OF THE INVENTION

Figure 1:
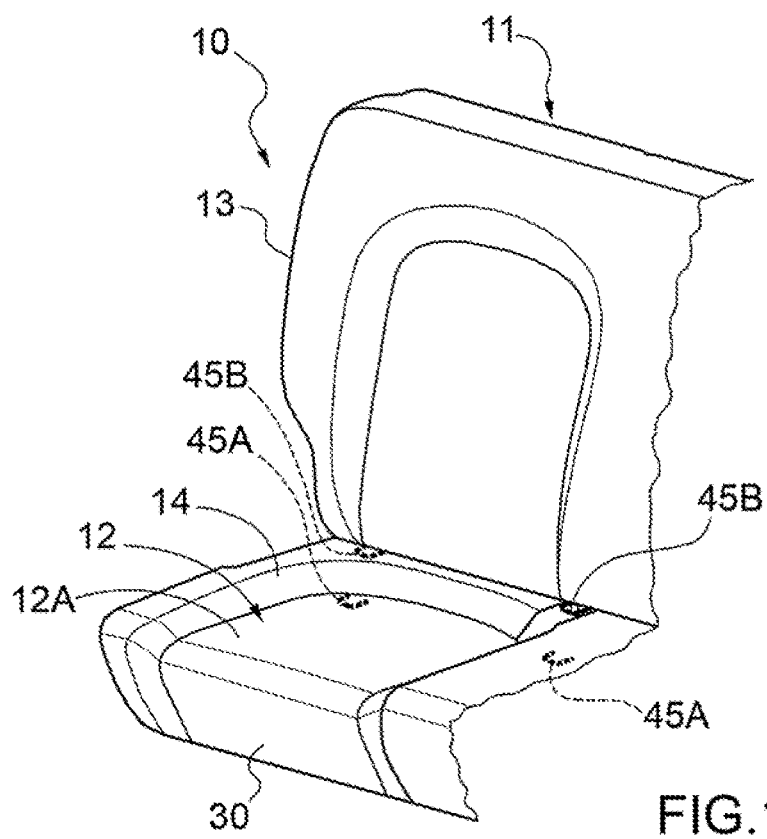
FIG. 1 shows a first configuration of a first embodiment of a seating system for a motor vehicle manufactured according to the teachings of the present invention.

In FIGS. 1 to 6, 10 indicates a seating system (first embodiment) for a motor vehicle (not shown in its entirety) manufactured according to the teachings of the present invention.

The seating system 10 comprises a seat 11, in particular a rear seat of the motor vehicle, comprising, in turn, a (substantially horizontal) seat cushion 12 coupled in a known manner to a (substantially vertical) seat back 13.

The lower surface of the seat cushion 12 is rested and secured (with known fastening means that are not shown) to a floor 20 belonging to the body or chassis (not shown in its entirety) of the motor vehicle (FIGS. 3-6).

Figure 2:
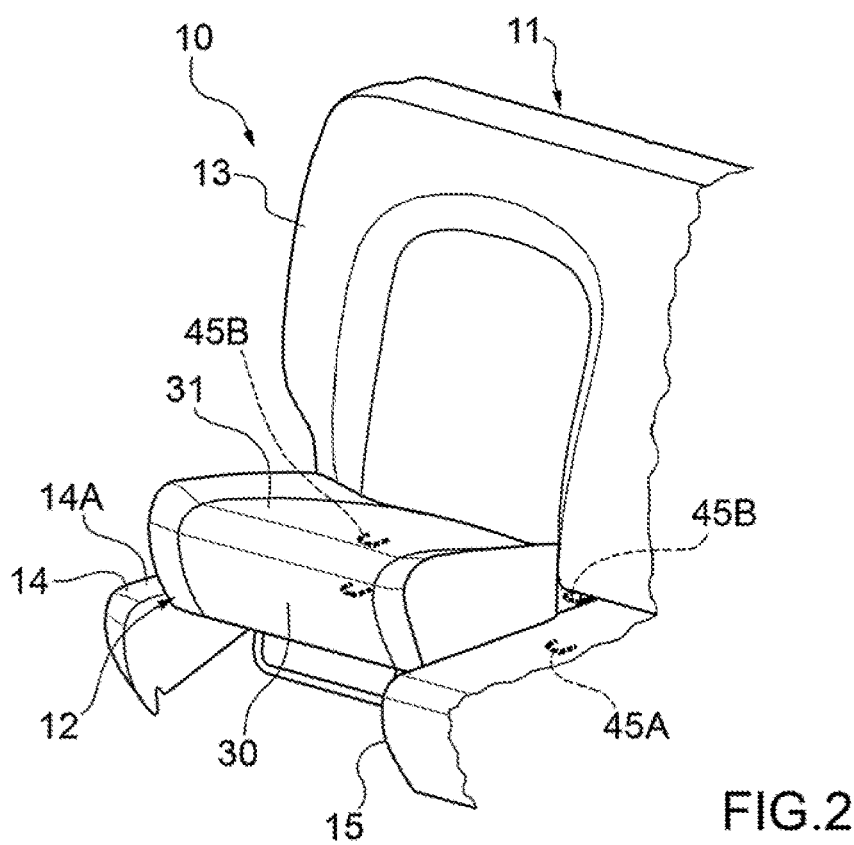
FIG. 2 shows a second configuration of the seating system illustrated in FIG. 1.

As shown in particular in FIG. 2, the seat cushion 12 has a substantially U-shaped, peripheral housing portion 14, which is preferably fixed with respect to the floor 20 and defines on the inside a seating 15 adapted to receive a body 30. The body 30 is a separate piece from the portion 14 and is movable between a raised configuration and a lowered configuration.

In the raised configuration, the body 30 is on the outside of the seating 15 and defines a child safety seat.

In the lowered configuration, instead, the body 30 engages the seating 15. Meanwhile, the upper surface 31 of the body 30, with the upper surface 14A of the peripheral portion 14, forms the upper surface 12A of the seat cushion 12. An adult occupant (ADL) can sit on the upper surface 12A, as has been shown in FIG. 3.

As shown in FIGS. 1 to 6, a releasable fastening apparatus 40 is provided to secure the body 30 with respect to the floor 20. In other words, the user can choose to lock/unlock the body 30 to/from the remaining part of the seat 11 by means of the releasable fastening apparatus 40.

The releasable fastening apparatus 40 comprises a pair of releasable fastening devices 41 identical to one another and placed at the sides of the body 30.

Each releasable fastening device 41, in turn, comprises a respective connecting element 42 which is of the type commonly known as "ISOFIX" (i.e. in compliance with the requirements of the ECE Regulation 14/2006), projects in a cantilever fashion from the body 30 and is provided with a respective groove or seating 43; each groove 43 is equipped with a respective lock 44 of a known type (not shown in its entirety).

In this first embodiment, the connecting element 42 is fixed with respect to the body 30 and the lock 44 is always protruding in any condition of use of the body 30.

The lock 44 comprises a hook-shaped latch adapted to selectively engage/disengage, by the deliberate action of a user, with/from a respective first anchoring element 45A, preferably in the shape of a U, and fixed with respect to the floor 20. In particular, the first anchoring elements 45A are fixed by means of known systems (for example, by welding) directly to the floor 20.

It should be noted that each first anchoring element 45A is also part of the releasable fastening device 41 and has constructional and dimensional features such that it can be engaged by the ISOFIX-type connecting element 42.

Furthermore, it should be noted that when the body 30 is arranged in the lowered configuration, the pair of connecting elements 42 and the pair of first anchoring elements 45A are not perceived by the seated adult occupant (ADL) (FIG. 3), because they do not cause discontinuity with respect to the remainder of the seat cushion 12.

When it is desired that the body 30 is part of the seat cushion 12, so as to be used by adults, all the user needs to do is insert the body 30 itself in the seating 15, defined by the (substantially U-shaped) peripheral portion 14, and snap-lock the locks 44 to the first anchoring elements 45A. In particular, in the illustrated embodiment, the first anchoring elements 45A are arranged below an intermediate stretch of the portion 14, next to the seat back 13.

On the contrary, if the user wants to use the body 30 to seat a child (CHL), first he/she has to open both locks 44 by manually actuating a control element, in this case, by pulling a tear-resistant tape 50.

By pulling the tape 50, according to an action exemplified in FIG. 3 by the arrow (F1), the latches are released from the first anchoring elements 45A, allowing the body 30 to be freely removed from the seating 15.

The user then extracts the body 30 from the seating 15 with a substantially horizontal movement in the direction of the arrow (F2), as illustrated in FIG. 4.

The body 30 is provided with a support 60 preferably defined by a leg that can rotate between a rest position, which is substantially horizontal, and a support position, which is substantially vertical. Preferably, the support leg has one end pivoted to a lower portion of the body 30 by a hinge 61.

When the body 30 is part of the seat cushion 12, the support 60 is folded back into the rest position and is housed in a suitable seating 62 formed in the lower portion of the body 30 itself.

Figure 5:
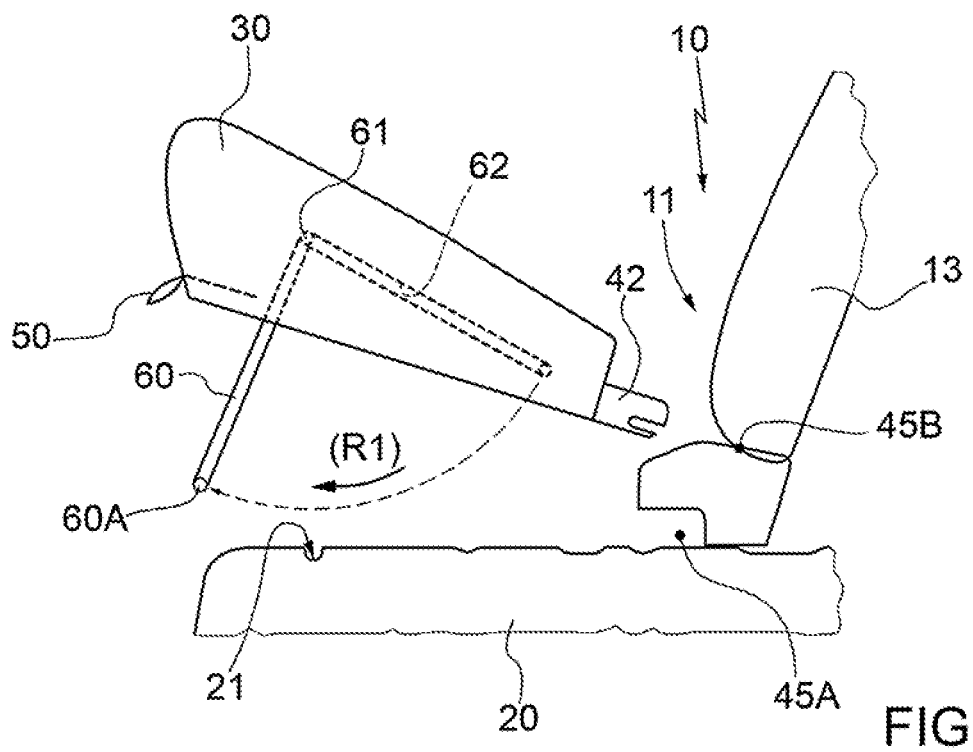
FIG. 5 shows the action of approaching the child safety seat of FIG. 4 towards an upper releasable fastening device; furthermore, the same figure shows the action of extracting a support foot of the child safety seat.

Instead, in case the user wishes to use the body 30 to seat a child (CHL) (FIGS. 5, 6), the support 60 is manually rotated, for example, counter clockwise by approximately 90° in the direction of the arrow (R1). In this way, the support 60 protrudes downwards from the overall dimensions of the body 30 so that a free end thereof 60A (opposite to the hinge 61) can be accommodated, as needed, for example in a suitable retaining recess 21 provided on the floor 20 (FIG. 5).

Figure 6:
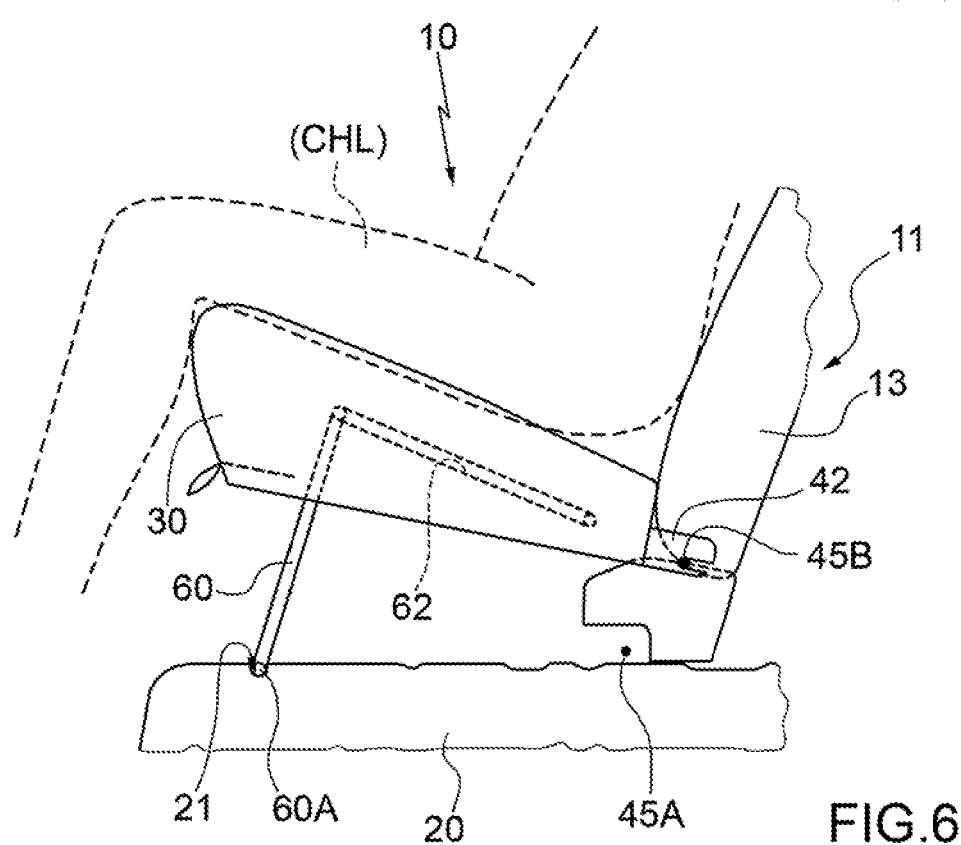
FIG. 6 shows the action of locking the child safety seat to the upper releasable fastening device; moreover, the dashed lines represent a child seated in the seating system.

As shown in FIG. 6, the same body 30 can be snap-fitted, with the same modes previously described in relation to the first pair of anchoring elements 45A, onto a second pair of anchoring elements 45B placed above the first pair of anchoring elements 45A and in fixed positions with respect to the aforementioned floor 20.

The set of each connecting element 42 and a respective second anchoring element 45B gives rise to a coupling of the ISOFIX type. In particular, the second anchoring elements 45B are of the standardized ISOFIX type, as already normally provided on motor vehicles, thus allowing for a releasable coupling of any child safety seat that is provided with ISOFIX locks.

Preferably, but not necessarily, the second anchoring elements 45B are fixed to a support frame which forms part of the seat back and is secured, for example in a releasable manner, to the body of the motor vehicle.

The second ISOFIX-type anchoring elements 45B are located in a junction region or in an intermediate region between the peripheral portion 14 of the seat cushion 12 and the seat back 13.

In this way, as already provided on currently manufactured motor vehicles, the second pair of anchoring elements 45B is in the shadow of the bulk of the padding of the seat back 13, and although well visible, is not perceived by the seated adult (ADL) and causes no discontinuity with respect to the rest of the seat back 13 (FIG. 6).

Preferably, but not necessarily, the first anchoring elements 45A are identical to the second anchoring elements 45B, both from the dimensional as well as the constructional point of view. According to variations not shown, the first anchoring elements 45A are constructionally different from the anchoring elements 45B, for example being defined by portions of a single transverse bar, but still configured so that they can be engaged by the locks 44 of the connecting elements 42.

If the user wants to restore the integrity of the seat cushion 12, all he/she has to do is proceed backwards with respect to the order of the operations described above, starting by opening the locks 44 by pulling the tape 50 (again according to an action exemplified by the aforementioned arrow (F1)) or by acting manually and directly on the connecting elements 42 next to the intermediate region between the portion 14 and the seat back 13.

Summarizing, we can therefore say that the releasable fastening devices 41 comprise respective connecting elements 42 placed on the body 30 at a distance from one another such as to selectively couple to the anchoring elements 45B, as any other child safety seat, and to the anchoring elements 45A; in particular, the first pair of anchoring elements 45A is arranged below the second pair of anchoring elements 45B, with respect to a common reference element consisting of the floor 20.

One of the advantages of the solution described above is that the seating 15 itself, which is formed in the seat cushion 12 of the seat 11, forms a receptacle for the body 30 when the latter is not used as a child safety seat to seat a child (CHL).

In an inventive way, it is the body 30 itself, when it is not used as a child safety seat, which forms a portion of the seat cushion 12.

Therefore, there is a considerable saving of space inside the motor vehicle and a significant increase in convenience for users, who need not purchase additional child safety seats.

According to a further embodiment of the present invention illustrated in FIGS. 7-16, in which corresponding elements are indicated with the same numbers and symbols as in FIGS. 1-6 (first embodiment), the connecting elements 42* are of the retractable type, i.e. they are movable between two operating positions (and therefore not fixed with respect to the body 30*), in particular along respective straight longitudinal axes parallel to the travelling direction of the motor vehicle.

It should be noted that, in order to distinguish this second embodiment (FIGS. 7-16) from the above-described first embodiment (FIGS. 1-6), the numbers of components similar to those of said first embodiment have been marked with an asterisk.

The introduction of this second embodiment (FIGS. 7-16) is necessary because there are motor vehicle models in which the available space is more reduced, so the first anchoring elements 45A* are shifted forwards with respect to the seat back 13*.

Figure 12:
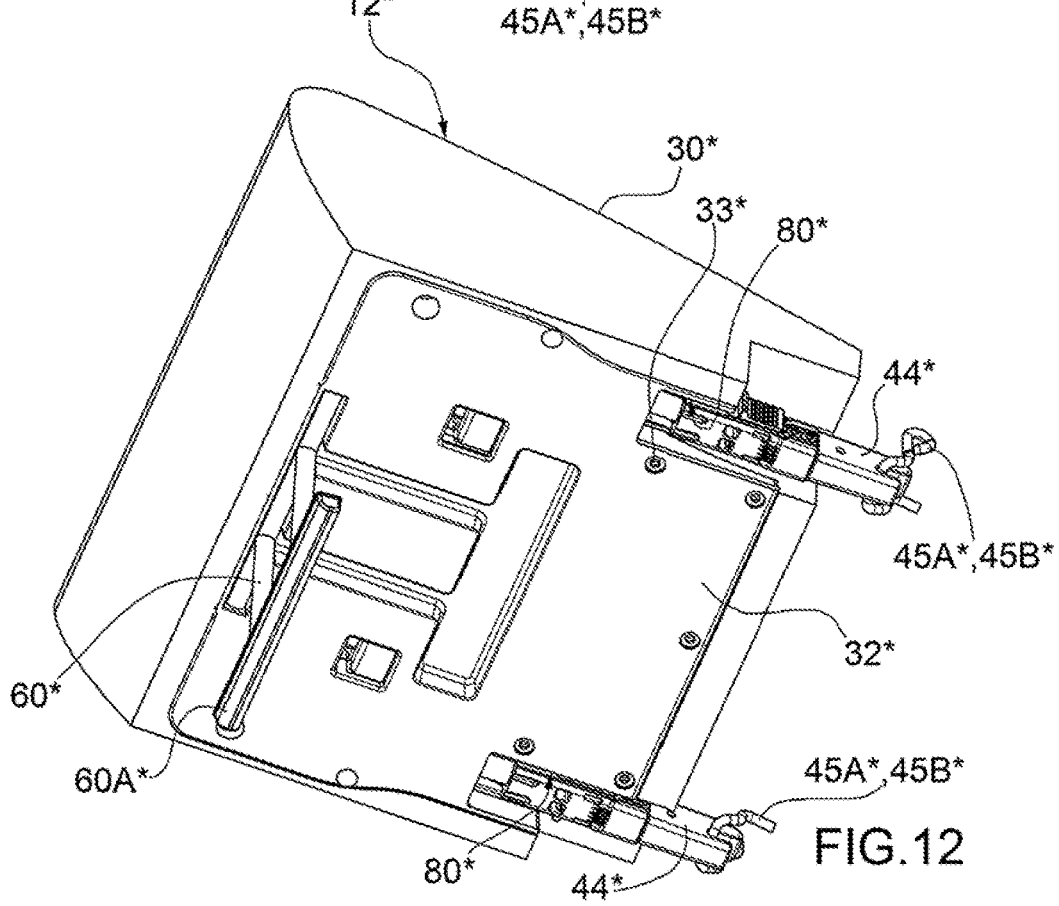
FIG. 12 shows a three-dimensional bottom view of the body in FIG. 11.
Figure 14:
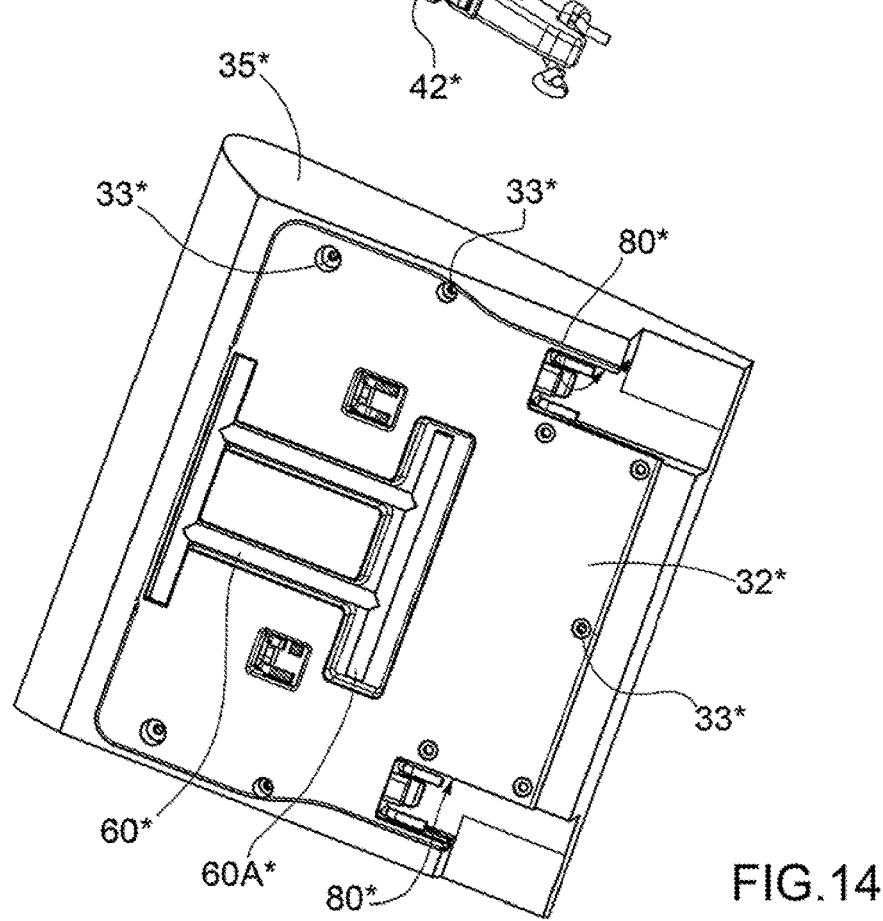
FIG. 14 shows a three-dimensional view of the body shown in FIGS. 11-13; in this case, the connecting elements are arranged in the retracted position.

For such a reason, each connecting element 42* can be selectively housed in a respective lateral seating 80* of the body 30*, as shown in greater detail in FIGS. 12, 14.

In this case too, the body 30* preferably comprises a support 60* similar to the support 60.

When the body 30* must be arranged in its raised configuration, the two connecting elements 42* are manually extracted by a user (for example by exploiting their weight and by suitably tilting the body 30*) from the respective lateral seatings 80*. Once arranged in an end-stop longitudinal extracted position, the two connecting elements 42* protrude from the outer peripheral dimension of the body 30* and can then be manually coupled to the second anchoring elements 45B*, as has been shown in FIGS. 9, 10, and according to the modes described above with reference to the first embodiment (FIGS. 5, 6).

Figure 7:
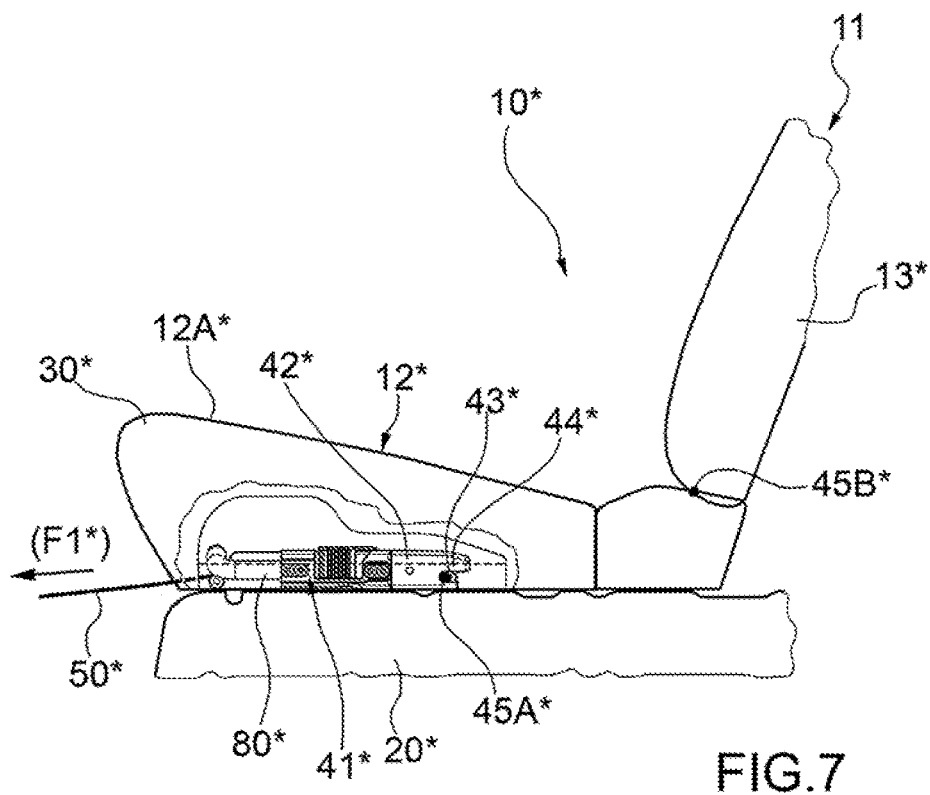
FIG. 7 shows the action of removing the child safety seat (in a second embodiment) from the lower releasable fastening device.

Instead, if the body 30* must form a portion of the seat cushion 12*, the two connecting elements 42* are retracted and inserted in the respective lateral seatings 80*. In this end-stop longitudinal retracted position, the locks 44* still protrude outside the lateral seatings 80*, even though they are located inside the outer peripheral dimension of the body 30*, and can be snap-coupled to the first anchoring elements 45A* (FIG. 7). In this configuration, the outer end of the tape 50* can be arranged between the body 30* and the floor 20, for instance below a seating which houses the support 60*, and, in particular, can be coupled in a predetermined, fixed position to a lower surface of the body 30*, for example by means of Velcro®.

Figure 8:
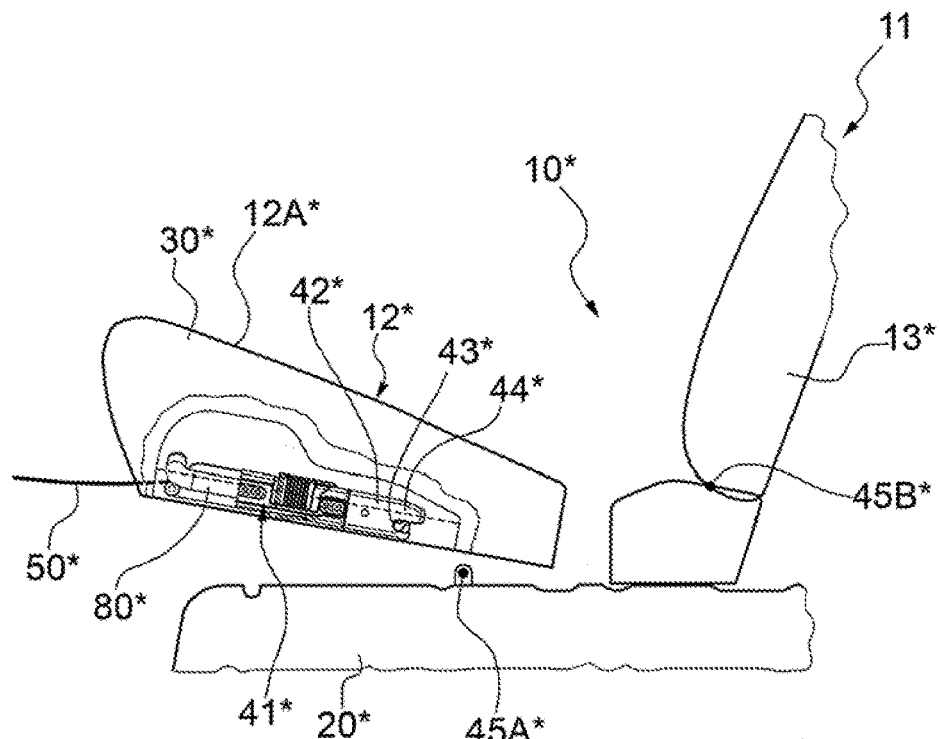
FIG. 8 shows in greater detail the action of removing the child safety seat of FIG. 7 from the lower releasable fastening device.
Figure 9:
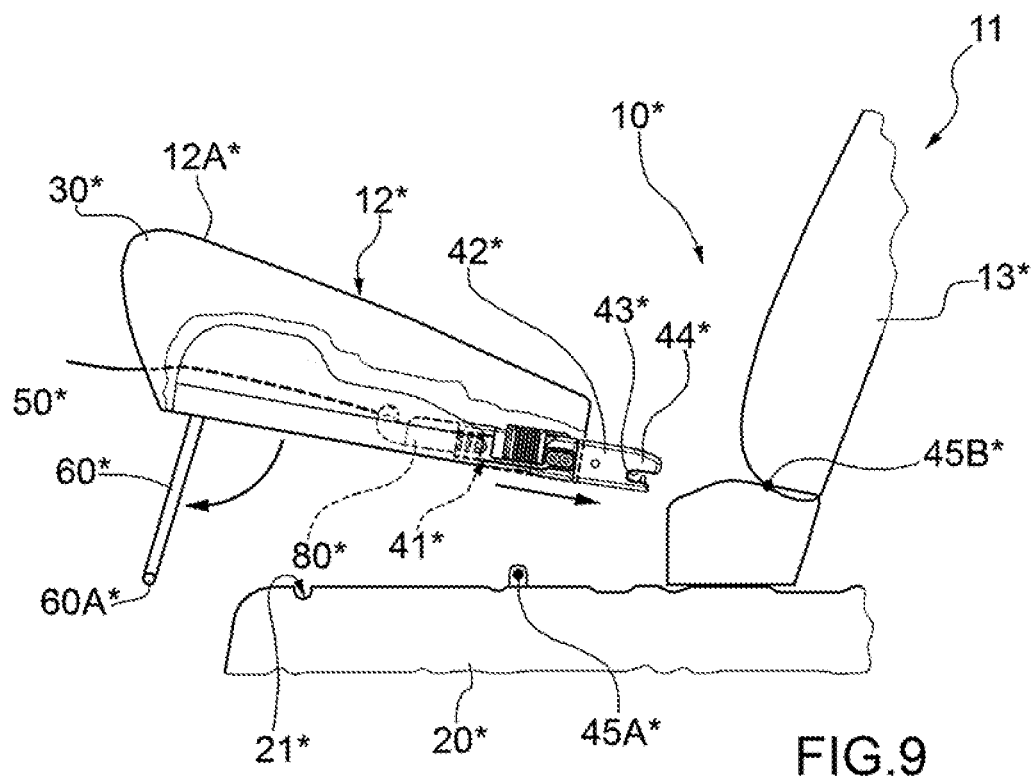
FIG. 9 shows in greater detail the action of approaching the child safety seat to the upper releasable fastening device.
Figure 10:
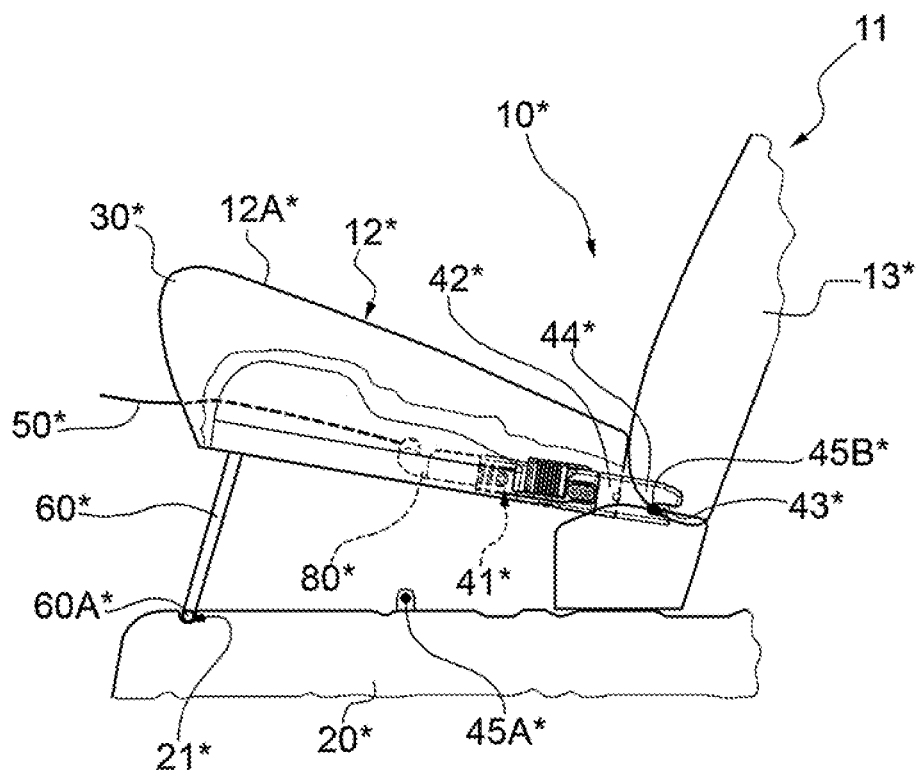
FIG. 10 shows in greater detail the action of locking the child safety seat to the upper releasable fastening device.
Figure 11:
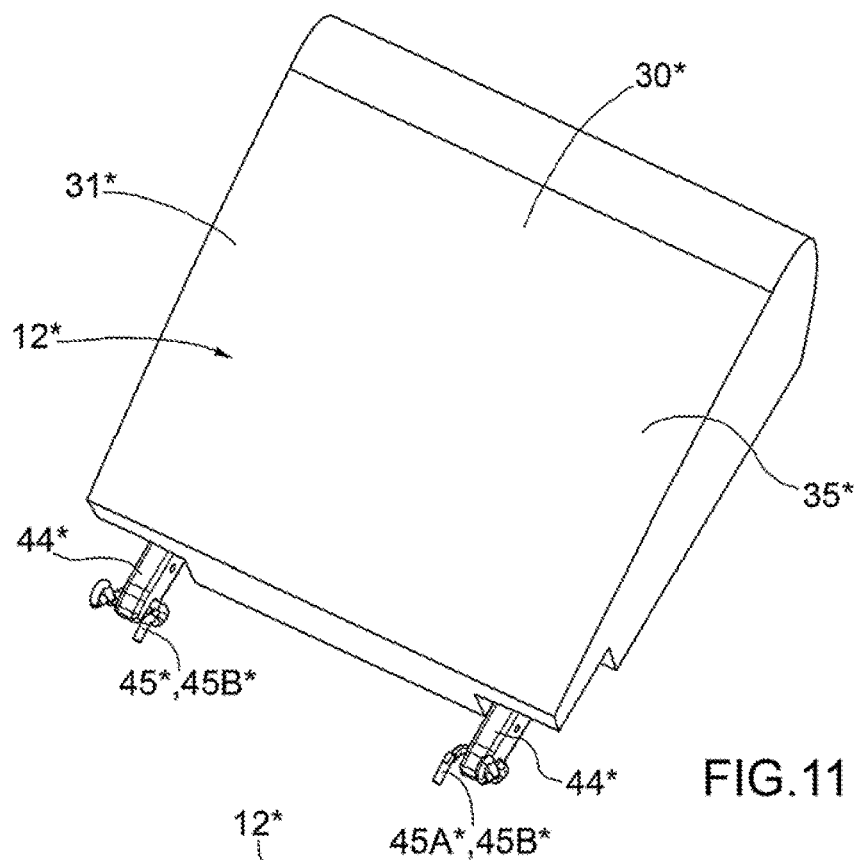
FIG. 11 shows a three-dimensional top view of a body that defines the child safety seat used in the seating system, which is the object of the invention, the connecting elements being arranged in an extracted position.

FIG. 8 illustrates an intermediate situation between the raised and lowered configurations, i.e. when the body 30* has already been removed from the first anchoring elements 45A* and not yet secured to the second anchoring elements 45B*, or vice versa.

Obviously, in order to release the locks 44*, the tape 50* is again used according to an action exemplified in FIG. 7 by the arrow (F1*).

Figure 13:
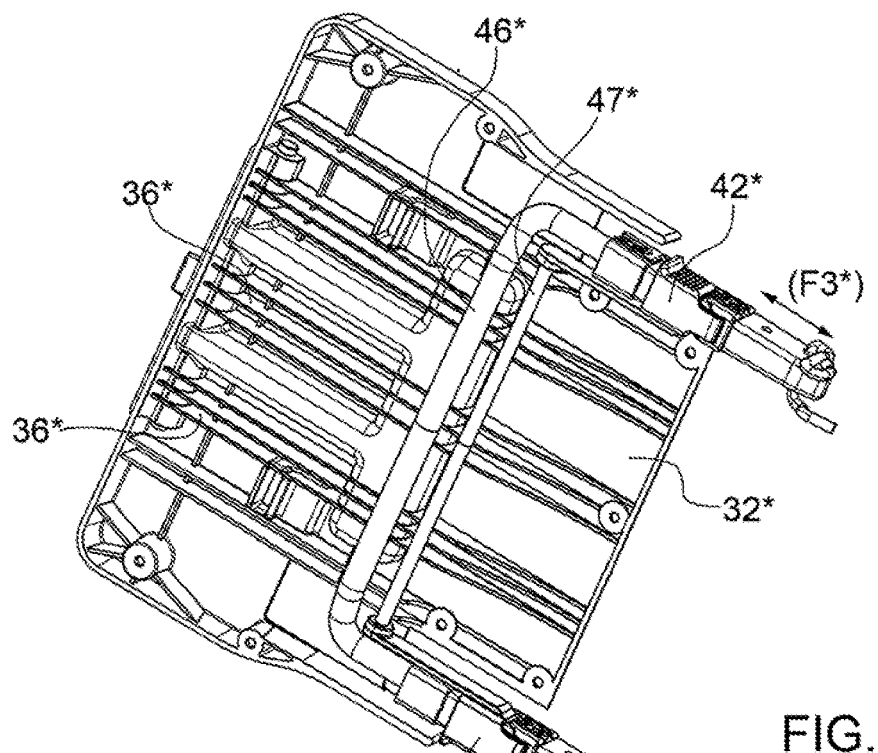
FIG. 13 shows a component of the body in FIGS. 11 and 12.

As shown in FIG. 13, the two connecting elements 42* are advantageously mutually connected via a crosspiece 46*, which causes the two connecting elements 42* to move simultaneously and in a coordinated manner in the respective lateral seatings 80* in either direction of a double headed arrow (F3*).

Moreover, the two locks 44* are mutually connected via a crosspiece 47* (FIG. 13) which can be actuated by means of said tape 50* (not illustrated in FIGS. 11-16) to obtain the release thereof. In other words, the two locks 44* can be opened simultaneously through the actuation of a single tape 50*.

As also shown in FIGS. 11-16, the body 30* preferably comprises a support frame defined by a top half-shell 34* and a bottom half-shell 32*, which is fixed to the top half-shell 34*, for example by means of a plurality of screws 33*. The body 30* further comprises a padding 35* fixed to the top half-shell 34*, which in turn is provided with an upholstery or external covering. The upper surface 31* of this covering takes part in the formation of the upper surface 12A* (FIG. 7) of the seat cushion 12* when the body 30* is arranged in its lowered configuration.

Preferably, the two lateral seatings 80* are formed in the coupling region of the two half-shells 32*, 34*, i.e. they are defined by the half-shell 32* for the lower part and by the half-shell 34* for the upper part. In this way, the manufacture of the two lateral seatings 80* is greatly simplified.

Similarly, the half-shells 32*, 34* define therebetween at least one guiding seat for the longitudinal movement of the connecting elements 42* between the end-stop retracted and extracted positions. In this regard, preferably, the half-shells 32*, 34* define therebetween a slot which is engaged in a sliding manner by the crosspiece 46* and defines such guiding seat.

Figure 15:
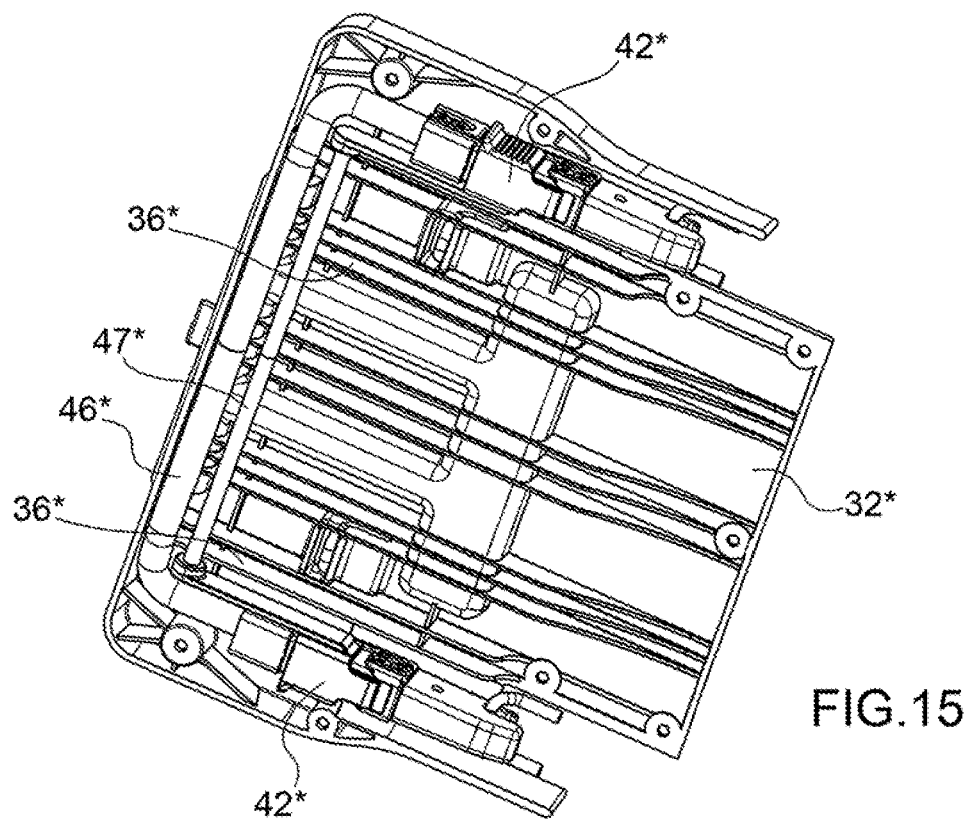
FIG. 15 shows a component of the body illustrated in FIG. 14.
Figure 16:
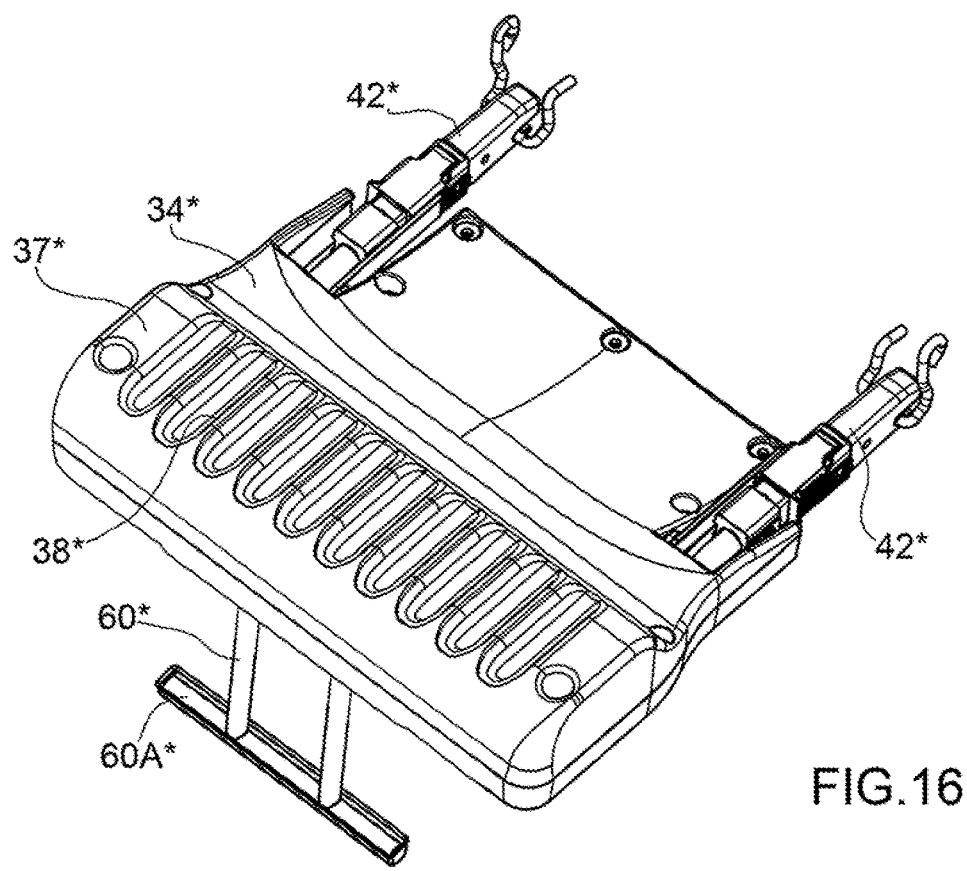
FIG. 16 shows a three-dimensional top view of the body illustrated in FIGS. 11 and 12 without the padding.

As shown in FIGS. 13, 15, the bottom half-shell 32* comprises, on an inner face, a plurality of reinforcement ribs 36*, which advantageously define a portion of the above mentioned guiding seat.

The top half-shell 34* has an upper face covered by the padding and comprising a rear area and a front area defining an upward projection 37* with respect to the rear area. The projection 37* is elongated in a transverse horizontal direction, orthogonal to the travelling direction of the motor vehicle, so as to simulate a protection crosspiece to prevent the occupant's pelvis from sliding forward in the event of an accident.

From the foregoing, it appears that the main advantage of the seating system described above is that a portion of the seat cushion of a normal seat for adults can be raised and coupled to the second anchoring elements 45B, 45B*, so as to define a child safety seat, with consequent saving in terms of space.

In particular, the body 30 can accommodate children belonging to groups 2 and 3 established in accordance with the ECE Regulation 44/2005 (i.e. Q6 and Q10 in accordance with the ECE Regulation 129/2014).

In addition, when the body 30, 30* is not used as a child safety seat, the body 30, 30* is secured to the motor vehicle body via the same type of ISOFIX locks 44 which allow it to be fixed to the second anchoring elements 45B, 45B*, without having to provide additional attachment systems on the body 30, 30*. As an additional element with respect to prior art solutions, it is simply necessary to provide the first anchoring elements 45A, 45A*, defined by any metallic element fixed to the floor 20 and having such a shape as to be engaged by the locks 44, 44*.

In its raised configuration, the body 30, 30* is comparable to a child safety seat of the "after-market" type, except for the possible presence of the support 60, 60*, which is located below the body 30, 30* and can be actuated manually.

In the lowered configuration, the body 30, 30* is not perceived by the adult occupant as a separate element, since it causes no discontinuity with respect to the remainder of the seat cushion. Moreover, in the first embodiment described and illustrated above, the first anchoring elements 45A remain hidden under the portion 14 of the seat cushion, so they do not affect the aesthetic value of the seat when the body 30 is removed from its lowered configuration.

The support leg 60, 60*, which is placed under the body 30, once manually rotated forward, cooperates with the releasable fastening apparatus 40 to support the weight of the child and the body 30, 30*, without the possibility of relative movements of the body 30, 30* itself with respect to the floor 20 when the body 30, 30* is arranged in the raised configuration.

The frame defined by two half-shells 32*, 34* is relatively easy to assemble and can perform different functions, i.e. the function of supporting the padding 35, 35* and the connecting elements 42, 42*, the function of guiding the longitudinal sliding of the connecting elements 42* in the second embodiment, the function as a protection crosspiece to prevent the sinking of the occupant's pelvis, etc.

Lastly, from the above it is clear that modifications and variations may be made to the seating system described and illustrated above without departing from the scope of protection of the present invention, as defined in the appended claims.

In particular, releasable retaining members could be provided for positioning and retaining the connecting elements 42* in at least one of the end-stop retracted and extracted positions; and/or the support leg 60, 60* may be replaced by other elements that perform the same function, in association with the support exerted by the releasable fastening devices 41, 41*; and/or one or more retaining or stop members can be provided on one between the floor 20 and the lower portion of the body 30, 30* (i.e. the lower face of the half-shell 32*) to engage respective seatings formed in the other of these components, so as to prevent any unwanted movements of the body 30, 30* on the floor 20 in a transverse direction when the body 30, 30* is arranged in its lowered configuration.

The seat may be supported by a fixed structure of the motor vehicle having a different shape from the floor 20. Furthermore, the support 60, 60* may be carried by the floor 20, instead of being carried by the body 30, 30*, and/or have a shape and/or structural features different from what has been shown by way of example.

In addition, the body 30, 30* may define the entire seat cushion 12, 12* (for example when the seat 11, 11* is provided as a single seat, and not as a rear seat with two or three places) or define an end part of the seat cushion 12, 12*, therefore without the need to provide the seating 15, 15*; and/or the seat 11, 11* may be different from what has been described and illustrated above, both as regards the coupling to the body of the motor vehicle and the specific features of the seat cushion 12, 12* and seat back 13, 13*; and/or the seat cushion 12, 12* of the rear seat may be provided with two bodies 30, 30* so that two children can be seated simultaneously in the motor vehicle.

The invention claimed is:

1. A seating system (10; 10*) for a motor vehicle; the seating system (10; 10*) comprising:
    a structure (20);
    a seat (11; 11*) supported by said structure (20) and comprising a seat cushion (12; 12*) and a seat back (13; 13*);
    a child safety seat; and
    a releasable fastening apparatus (40; 40*) for securing said child safety seat to said seat (11; 11*); said releasable fastening apparatus (40; 40*) comprising:
        a) upper releasable fastening means (45B; 45B*) arranged in a fixed position with respect to said structure (20);
        b) connecting means (42; 42*) carried by said child safety seat and suitable to be coupled in a releasable manner to said upper releasable fastening means (45B; 45B*) in order to maintain said child safety seat in a raised configuration;
    characterized in that said child safety seat is defined by a body (30; 30*) which forms part of said seat cushion (12; 12*), and in that said releasable fastening apparatus (40; 40*) comprises lower releasable fastening means (45A; 45A*) fixed with respect to said structure (20) and configured so as to be engaged by said connecting means (42; 42*), in a releasable manner and as an alternative to said upper releasable fastening means (45B; 45B*), in order to maintain said body (30, 30*) in a lowered configuration.

2. A seating system (10; 10*) according to claim 1, characterized in that said seat cushion (12; 12*) comprises a housing portion (14), which defines a seating (15) which receives said body (30, 30*) when said body (30, 30*) is arranged in the lowered configuration.

3. A seating system (10; 10*) according to claim 1, characterized in that said body (30; 30*), when arranged in the lowered configuration, has an upper surface (31) that, in concert with an upper surface (14A) of said housing portion (14), forms the upper surface (12A) of said seat cushion (12).

4. A seating system (10; 10*) according to claim 1, characterized in that said lower releasable fastening means (45A; 45A*) and said upper releasable fastening means (45B; 45B*) are identical to each other.

5. A seating system (10; 10*) according to claim 1, characterized in that said connecting means (42; 42*) are defined by two connecting elements of the ISOFIX type.

6. A seating system (10; 10*) according to claim 1, characterized in that said connecting means (42; 42*) are defined by two connecting elements that are permanently fixed with respect to said body (30).

7. A seating system (10; 10*) according to claim 1, characterized in that said connecting means (42*) are defined by two connecting elements that can be retracted with respect to said body (30*).

8. A seating system (10; 10*) according to claim 2, characterized in that said lower releasable fastening means (45A) are located below said housing portion (14).

9. A seating system (10; 10*) according to claim 1, characterized in that said upper releasable fastening means are defined by two anchoring elements (45B; 45B*), which are of the ISOFIX type and are located in an intermediate region between said seat cushion (12) and said seat back (13).

10. A seating system (10; 10*) according to claim 7, characterized in that said body (30; 30*) comprises a top half-shell (34*), a bottom half-shell (32*) fixed to said top half-shell (34*) by fastening means (33*), and a padding supported by said half-shells.

11. A seating system (10; 10*) according to claim 10, characterized in that said half-shells (32*, 34*) define therebetween a guiding seat for guiding said connecting elements (42*) between a retracted position and an extracted position.

12. A seating system (10; 10*) according to claim 10, characterized in that said half-shells (32*, 34*) define therebetween two lateral seatings (80*), which partially house said connecting elements (42; 42*) when the connecting elements are retracted.

13. A seating system (10; 10*) according to claim 11, characterized in that at least one of the two half-shells (32*, 34*) has a plurality of inner ribs (36*, 38) defining said guiding seat.

14. A seating system (10; 10*) according to claim 11, characterized in that said guiding seat is engaged in a sliding manner by a crosspiece (46*) which connects said connecting elements (42*) with each other.

15. A seating system (10; 10*) according to claim 10, characterized in that said top half-shell (34*) has an upper face covered by said padding and comprising a rear area and a front area defining an upward projection (37*) with respect to the rear area; said upward projection (37*) being elongated in a transverse horizontal direction.

16. A seating system (10; 10*) according to claim 1, characterized in that it comprises a support (60; 60*) carried by one between said body (30; 30*) and said fixed structure (20) and suitable to be coupled to the other between said body (30; 30*) and said fixed structure (20), so as to maintain said body (30; 30*) in the raised configuration.

17. A seating system (10; 10*) according to claim 16, characterized in that said support (60, 60*) is in the form of a leg that can rotate between a rest position, which is substantially horizontal, and a support position, which is substantially vertical.

\* \* \* \* \*